US005478974A

United States Patent [19]

O'Dea

[11] Patent Number: 5,478,974
[45] Date of Patent: Dec. 26, 1995

[54] ON-BOARD VEHICLE WEIGHING SYSTEM

[75] Inventor: James O. O'Dea, San Clemente, Calif.

[73] Assignee: Hi-Tech Scales, Inc., Eugene, Oreg.

[21] Appl. No.: 63,140

[22] Filed: May 17, 1993

[51] Int. Cl.[6] .................................................. G01G 19/40
[52] U.S. Cl. ........................ 177/25.14; 177/136; 177/137
[58] Field of Search .................................... 177/136, 137, 177/25.14, 141, 165

[56] References Cited

U.S. PATENT DOCUMENTS

| 3,154,160 | 10/1964 | Rockwell | 177/136 |
|---|---|---|---|
| 3,306,384 | 2/1967 | Ross | 177/136 |
| 3,603,418 | 9/1971 | Schmidt et al. | 177/136 |
| 3,854,540 | 12/1974 | Holmstrom, Jr. | 177/136 |
| 4,067,061 | 1/1978 | Juhasz et al. | 395/550 |
| 4,258,421 | 3/1981 | Juhasz et al. | 364/424.04 |
| 4,328,494 | 5/1982 | Goodall | 340/870,18 |
| 4,456,084 | 1/1984 | Miller | 177/141 |
| 4,588,038 | 5/1986 | Takagi | 177/141 |
| 4,651,838 | 3/1987 | Hamilton et al. | 177/209 |
| 4,771,837 | 9/1988 | Appleton et al. | 177/139 |
| 4,789,033 | 12/1988 | Dohrmann | 177/137 |
| 4,832,141 | 5/1989 | Perini et al. | 177/141 |
| 4,884,644 | 12/1989 | Reichow | 177/137 |
| 4,917,197 | 4/1990 | Waite, Jr. | 177/137 |
| 5,016,200 | 5/1991 | Passarelli | 177/136 X |
| 5,086,656 | 2/1992 | Schwendemann et al. | 177/137 X |
| 5,119,894 | 6/1992 | Crawford et al. | 177/145 |
| 5,119,895 | 6/1992 | Gradert | 177/208 |
| 5,161,628 | 11/1992 | Wirth | 177/137 |
| 5,167,289 | 12/1992 | Stevenson | 177/141 |
| 5,239,137 | 8/1993 | Patzig | 177/136 |

FOREIGN PATENT DOCUMENTS

0540741A1  7/1991  European Pat. Off. .

OTHER PUBLICATIONS

"Load Analyzer" brochure, 4 pages, Copyright 1978, The Pactronics Corporation, Cucamonga, Calif.
"Load Indicator for Ore Haulers" Pamphlet YM 18–103 NA, 4 pages, Asea Inc., White Plains, N.Y.

Primary Examiner—Peter S. Wong
Assistant Examiner—Randy W. Gibson
Attorney, Agent, or Firm—Klarquist Sparkman Campbell Leigh & Whinston

[57] ABSTRACT

A method and apparatus for determining vehicle weight measurements using an on-board weighing system comprises a plurality of sensor assemblies each generating a weight related electrical signal and a processing and display unit. Each weight related signal is processed in the unit using two constant values which are stored in the unit. The constant values are calibrated at two vehicle weights, providing accurate vehicle weight measurements through a range of vehicle weights.

26 Claims, 5 Drawing Sheets

ON-BOARD VEHICLE WEIGHING SYSTEM

FIELD OF THE INVENTION

The present invention relates to a weighing system capable of being installed on board a vehicle for providing accurate weight measurements of the vehicle through a range of vehicle weights.

BACKGROUND OF THE INVENTION

The weight of a vehicle is often of crucial importance, especially to carriers in the trucking industry. In the trucking industry, the cost of delivering a load for commercial purposes is assessed to the customer according to the weight of the load and the distance it must travel. Knowledge of load weight is therefore necessary to ensure that the customer is assessed the full price of transporting the load. Weight information can also be used to optimize the load at or near the vehicle's maximum capacity.

Previously, vehicle operators have relied on private or government-operated stationary scales or weigh stations for load weight information. Usually, though, the stationary scale is located inconveniently far from the customer's loading dock. Thus, the vehicle operator has had to rely on the customer or shipping broker's quoted load weight or must travel, sometimes out of his or her way, to the nearest stationary scale for an accurate measurement. If the load weight quote proves erroneous at a stationary scale, the vehicle operator may have to return to the customer's loading dock to obtain full payment. The vehicle operator's inability to accurately determine the load weight at the loading dock, therefore, can result in wasted operator time, wasted vehicle travel mileage and time, and erroneous or fraudulent freight charges.

The weight of commercial cargo vehicles is also important from the perspective of public safety and highway maintenance. Overloading a commercial cargo vehicle can create a hazard by reducing the vehicle's stability and braking ability. An overloaded commercial cargo vehicle also causes significantly greater wear to public highways and to the vehicle itself. Governments therefore regulate vehicle weight by specifying a maximum legal load limit and fining vehicle operators for any overage. The load limit laws, however, have been enforced using the same stationary scales relied on by operators to determine a vehicle's loaded weight for pricing purposes. Law enforcement agencies have even been known to use the records of privately operated stationary scales in enforcing the load limit laws. Vehicle operators may therefore lack the ability to detect non-compliance before being subject to liability for overloading.

Accordingly, an on-board weighing system offers significant advantages over stationary scales. With on-board weighing systems, vehicle operators can determine vehicle weight at the loading dock or while under way to ensure accurate freight charge calculation, optimize load weight, and voluntarily comply with load limits.

Various prior on-board weighing devices are known. The devices have employed various weight sensor apparatus for sensing the weight of the vehicle's load, including load cells, strain gauges, displacement transducers on leaf or coil spring suspended vehicles, or pressure transducers on height-levelled, air spring suspended vehicles. The various weight sensor apparatus generate an electrical signal related to the load weight of the vehicle. Generally, the prior devices further comprise a cab-mounted read-out device for displaying the vehicle's load weight in response to a weight sensor signal.

Typically, the read-out devices operate similarly to a simple gauge and may have zeroing, offset, or gain screw adjustments. Read-out devices of this type are capable of calibrating to only a single load weight. To calibrate the device, the vehicle is weighed at a stationary scale to determine its weight with a given load. The screw adjustments are then adjusted until the device displays the correct weight of the given load. After calibration, the device is accurate at the given load weight. However, the calibration procedure does not guarantee that the device will read accurately for other than the given calibrated load weight. Re-calibration of the device to another load weight affects the accuracy of the device at the previously calibrated load weight. Since the devices are capable of calibrating to only a single load weight, the devices can assure accuracy at only the single load weight.

A further problem with prior on-board weighing devices is created by the practice common to the trucking industry of switching trailers of tractor/trailer combination trucks. Characteristics of the various weight sensor apparatus employed by weighing devices typically vary significantly even between apparatus of the same type. It is therefore necessary to recalibrate the read-out devices every time trailers are switched. Since accurate recalibration requires the use of a stationary scale, the advantages of having an on-board scale are lost with every trailer switch.

One prior on-board vehicle weighing system disclosed by Perini et al. in U.S. Pat. No. 4,832,141 overcomes some of the disadvantages of other prior systems. The Perini system determines a vehicle's weight from a weight related signal generated by a weight sensor apparatus. A cab mounted read-out device receives the signal and determines the vehicle weight. The read-out device includes an offset amplifier with a screw adjustment for shifting the DC voltage level of the signal. The signal is then converted by an analog-to-digital converter to a digital value. The digital value is used as an address for looking up the vehicle weight in a conversion table stored in a read only memory (ROM).

The read-out device has two adjustments for calibrating the system to a weight related signal generated by a particular weight sensor apparatus. First, a conversion table which most correctly correlates the weight related signal to vehicle weights is selected out of a plurality of conversion tables stored in the ROM using a set of switches. Second, the offset adjustment screw is tuned until the correct vehicle weight is displayed by the read-out device. When properly adjusted, the read-out device can determine vehicle weight fairly accurately through a range of vehicle weights.

The Perini weighing system has two major disadvantages. First, various weight sensor apparatus have different characteristics and produce weight related signals that correlate differently to the vehicle weight. Since their signals correlate differently to vehicle weight, each weight sensor apparatus typically requires a different conversion table which correctly correlates the signal to vehicle weights. If the correct conversion table for a weight sensor apparatus is not included in the ROM, the weighing system can not accurately determine vehicle weight from the signal generated by the weight sensor apparatus. A less accurate conversion table may be selected instead, but inaccurate and unreliable vehicle weight measurements will result. For the weighing system to be generally applicable to a large variety of weight sensor apparatus, a commensurate number of conversion tables must be stored in the ROM. However, increasing the number of tables stored in the ROM only increases the likelihood that the correct conversion table is included. It does not guarantee that the correct conversion table is included. Also, increasing the number of conversion tables increases the storage requirements of the ROM, consequently increasing the cost and complexity of the system.

The second major disadvantage with the Perini weighing system is that the calibration of the system is not easily reproducible. To accommodate trailer switching, it is desirable to be able to reset the weighing system for a trailer that was previously calibrated without having to repeat the calibration process involving the use of a stationary scale. Calibrating the Perini weighing system additionally involves tuning an adjustment screw. Since adjustment screws are difficult to accurately reset to a previously calibrated setting, the calibration of the Perini weighing system is not easily reproducible.

SUMMARY OF THE INVENTION

The vehicle weighing apparatus and method of the present invention provides the ability to easily and quickly calibrate and accurately determine weight measurements of a vehicle throughout a range. In accordance with a preferred embodiment of the invention, an electrical signal related to a weight parameter of the vehicle, such as the weight of the vehicle and load on an axle assembly of the vehicle, is processed using two values or constants to determine a weight measurement. When the constants are properly calibrated, the invention accurately determines the weight measurement through a range of vehicle loads from empty to fully loaded.

In one embodiment of the invention, a weight sensor assembly generates a signal related to a portion of the weight of a vehicle and load which is supported on an axle assembly. The signal is processed using a ratio value and an unsprung weight value associated with the axle assembly to determine the weight of the axle assembly. The axle assembly weight is the weight applied by the axle assembly against a road or other surface supporting the axle assembly and includes the weight of the axles, wheels, tires, suspension, and other components which form the axle assembly as well as the weight of a portion of the vehicle and load supported on the axle assembly. The ratio value corresponds to the ratio of pounds or other unit of weight per increment of a digital value of the signal. The unsprung weight value corresponds to the portion of the weight of the axle assembly not being supported by the axle assembly, i.e. the weight of the components which form the axle assembly, but not the weight of the vehicle and load supported on the axle assembly.

The signal is processed by converting it to a digital value, then multiplying the digital value by the ratio value and adding the unsprung weight value to the product of the digital value and the ratio value. The weights of additional axle assemblies of the vehicle are determined in a similar manner by processing a signal related to the weight supported on an additional axle assembly using ratio and unsprung weight values associated with the respective axle assembly.

The constants are calibrated according to the invention to provide accurate weight measurements throughout a range of vehicle loads by determining the actual weight measurement with a stationary scale at two reference loads, e.g., empty and fully loaded. In an embodiment of the invention using ratio and unsprung weight values to determine an axle assembly weight, the ratio value is calibrated to equal the ratio of the difference in the actual axle assembly weights at the two reference loads to the difference in the digital value of the weight related signal at the two reference loads. The unsprung weight value is calibrated to equal the actual axle assembly weight at a first of the reference loads minus the product of the ratio value and the digital value of the weight related signal at the first reference load. Axle weights subsequently determined according to the invention using the calibrated ratio and unsprung weight values are accurate for all vehicle loads in a range between the two reference loads.

Since in accordance with the invention a weight measurement of a vehicle can be accurately determined if two constants are known, trailer switching is easily accommodated without recalibration. The constants for determining various weight measurements of a trailer can be marked on the trailer after an initial calibration and used for weight measurement determinations when subsequently hitched to other tractors.

Additional features and advantages of the invention will be made apparent from the following detailed description of a preferred embodiment which proceeds with reference to the accompanying drawings.

DETAILED DESCRIPTION OF THE PREFERRED EMBODIMENT

Figure 1:
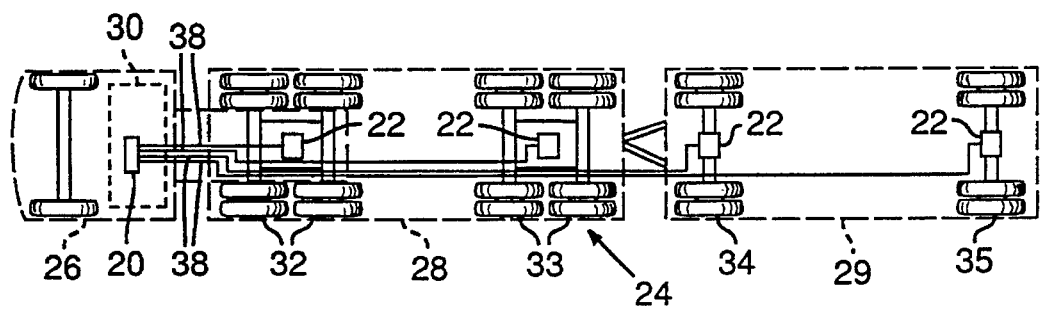
FIG. 1 is a schematic view of a tractor/trailer rig with an on-board weighing system according to a preferred embodiment of the present invention.

With reference to FIG. 1, an on-board weighing system according to a preferred embodiment of the present invention comprises a processing and display unit 20 and one or more sensor assemblies 22. The weighing system is installable on a vehicle 24 to provide accurate vehicle weight measurements available on demand. For example, in the embodiment illustrated in FIG. 1, the weighing system is installed on a tractor 26 and double trailer 28, 29 rig. To provide easy access by a vehicle operator, the processing and display unit 20 is generally located in a cab portion 30 of the tractor 26. The sensor assemblies 22 can have various configurations and are generally associated one-to-one with axle assemblies 32–35 of the vehicle 24 to generate electrical signals related to a weight of the vehicle and any load carried on its respective axle assemblies. (The term axle assembly is used herein to refer to a group of one or more axles, wheels and related equipment each of which supports a portion of a frame of the vehicle.) In other embodiments of the invention, the sensor assemblies can be configured to generate a signal related to other vehicle weight parameters such as the weight of a vehicle platform and load on a vehicle frame. The sensor assemblies 22 are electrically connected to the processing and display unit 20 with cables 38 to thereby transmit the weight related signals to the unit 20. The unit 20 processes the signals according to the invention to determine vehicle weight measurements and display the same.

Figure 2:
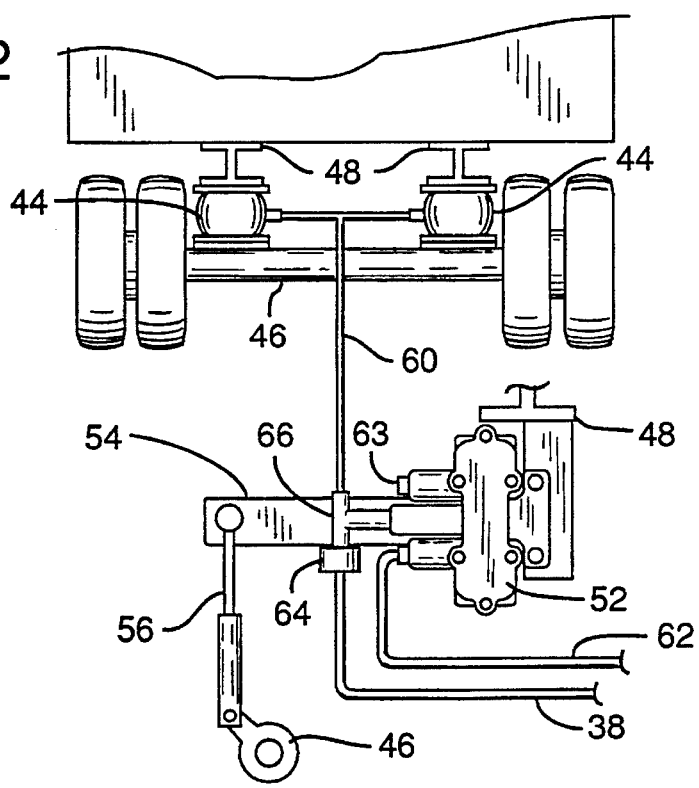
FIG. 2 is a schematic view of an air suspension adapted to serve as a sensor assembly according to a preferred embodiment of the invention for use in the on-board weighing system of FIG. 1.

Referring to FIG. 2, a large percentage of commercial cargo vehicles currently in use employs air suspensions. Typical air suspensions can be easily and inexpensively adapted to serve as a sensor assembly 22 for generating an electrical signal related to the weight of a vehicle and load on an axle assembly. In a typical air suspension, a pair of air bags 44 is mounted between each axle 46 of a vehicle and its frame 48. The inflation of the air bags is regulated with a height-levelling valve 52 mounted to the vehicle frame and operated by a valve actuator arm 54 and push-rod 56 connected to the axle. The height levelling valve introduces additional compressed air to or exhausts air from the air bags through an air line 60 connecting the levelling valve and the air bags to support the vehicle frame at a predetermined height above the axle. The compressed air is typically supplied to the levelling valve 52 by a second air line 62 from an air compressor (not shown) driven by the vehicle's motor. Excess air is vented from an exhaust port 63. With air bag inflation properly regulated by a height levelling valve the internal pressure of the air bags is related to the weight of the vehicle supported on the air bags.

Adaptation of the air suspension to serve as a weight sensor assembly is accomplished by attaching a conventional pressure transducer 64 to the air line 60 connecting the levelling valve 52 and the air bags 44. Pressure transducer attachment is readily effected by detaching the air line 60 from the levelling valve 52, then connecting the air line 60, levelling valve 52 and pressure transducer 64 with a tee connector 66. The pressure transducer 64 generates an electrical signal related to the internal pressure of the air bags, and hence related to the weight supported on the air suspension. The signal generated by the pressure transducer is transmitted to the processing and display unit 20 (FIG. 1) through the cable 38. If the vehicle is equipped with separate levelling valves controlling the inflation of the air bags of each axle assembly, separate signals related to the weight on each axle assembly can be generated. An air suspension adapted to serve as a sensor assembly 22 of this type is described by Perini et al. in U.S. Pat. No. 4,832,141, the disclosure of which is incorporated herein by reference.

Figure 3:
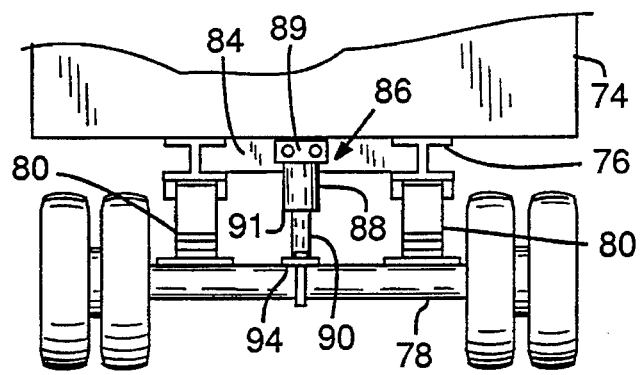
FIG. 3 is a schematic view of a sensor assembly according to another embodiment of the invention comprising a leaf spring suspension and a displacement transducer mounted between a frame and a frame supporting axle assembly of a vehicle for use in the on-board weighing system of FIG. 1.

Referring now to FIG. 3, the sensor assemblies 22 can be alternatively embodied in any apparatus capable of generating a signal related to a weight parameter of a vehicle. For example, in a vehicle 74 in which a frame 76 of the vehicle is suspended on an axle assembly 78 using two or more mechanical leaf or coil springs 80, the springs are compressed according to the weight of the vehicle and load on the springs. The distance separating the frame or underside 84 of the vehicle from the axle assembly is therefore related to the weight of the vehicle and load on the axle assembly. To generate a signal related to the weight on the axle assembly, a displacement transducer 86 is mounted between the axle and the underside 84 of the vehicle. A typical displacement transducer suitable for this purpose comprises a housing 88 attached at one end 89 to the vehicle underside 84 and having a slidably extending rod 90 at an opposite end 91. A distal or extending end 94 of the rod 90 is attached to the axle assembly 78. A potentiometer (not shown) within the housing 88 and operatively engaged by the rod 90 generates an electrical signal related to the displacement of the vehicle frame 76 from the axle assembly 78 and hence related to the weight on the axle assembly. The displacement transducer 86 and mechanical springs 80 of an axle assembly 78 in a vehicle with a mechanical spring suspension can therefore serve as a sensor assembly 22 in accordance with the invention.

Figure 4:
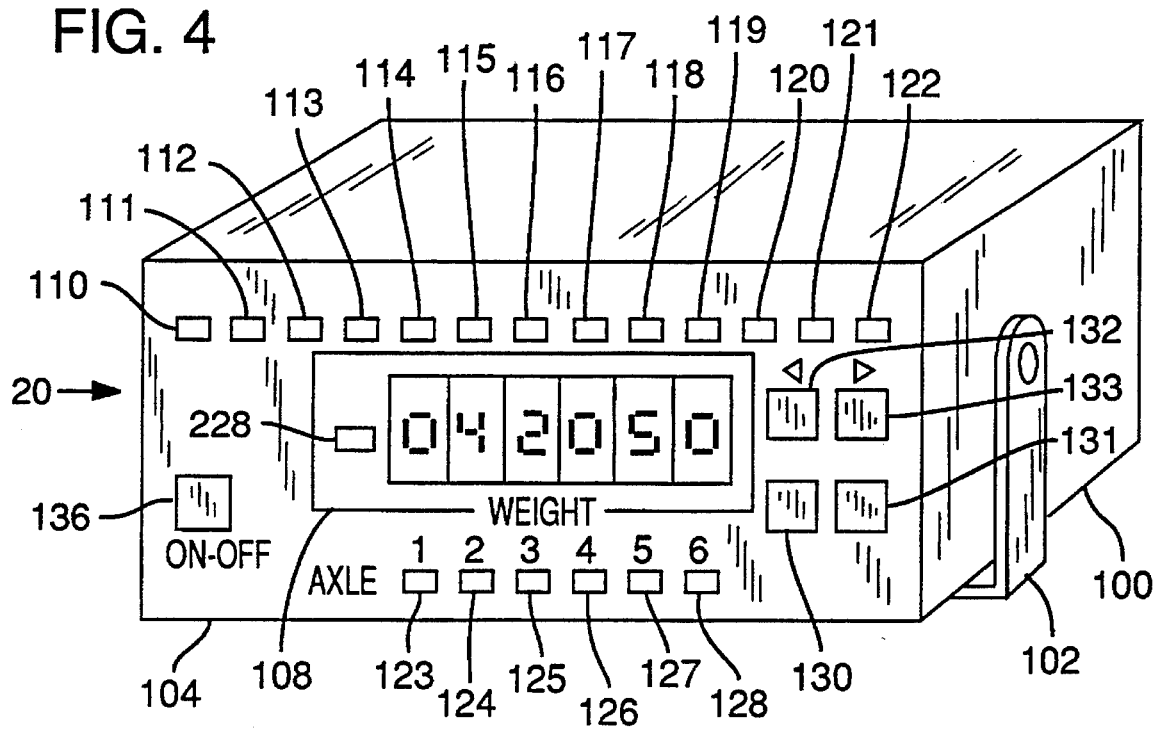
FIG. 4 is a front perspective view of a cab-mounted console in the on-board weighing system of FIG. 1 including the front panel.
Figure 5:
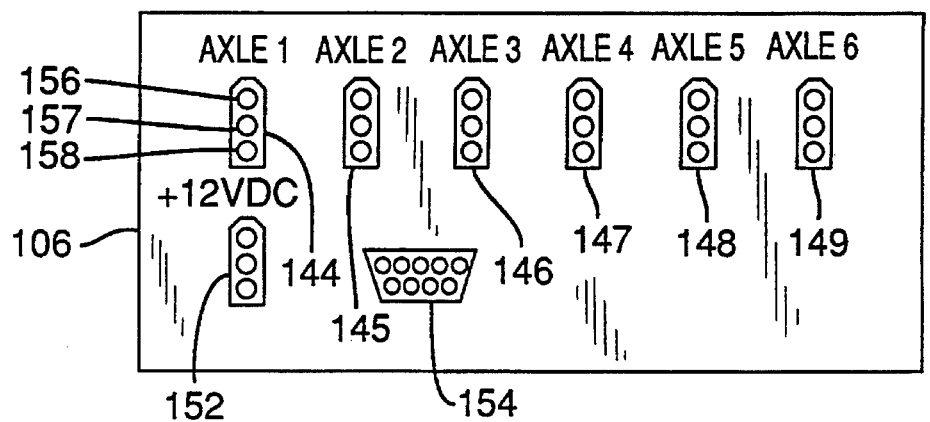
FIG. 5 is a rear view of the console in FIG. 4 including the back panel.

Referring now to FIGS. 4 and 5, the weight related signals of the various sensor assemblies 22 are received by the processing and display unit 20 and processed according to the invention to determine vehicle weight measurements. In the preferred embodiment of the invention, the processing and display unit 20 comprises a generally box-shaped console 100. The console 100 has a mounting bracket 102 for mounting the console in a convenient location in a cab of the vehicle 24 such as above or below a dashboard. The console 100 further comprises a front panel 104 and a back panel 106. On the front panel 104 are a digital numeric display 108, light emitting diodes 110–128 for indicating unit status, data entry keys 130–133, and an on/off switch 136. On the back panel 106 are signal input ports 144–149, a power connector 152, and an RS-232 standard data input/output port 154.

The weight related signals generated by the sensor assemblies 22 are received by the unit 20 over the cables 38 at the signal input ports 144–149. The signal input ports 144–149 and the cables 38 each comprises three conductors 156–158. The processing unit 20 provides DC power voltage and ground signals to a sensor assembly 22 on two of the conductors and receives the weight related signal from the sensor assembly on a third. Since six signal input ports are provided in the preferred embodiment, up to six weight related signals for up to six axle assemblies can be received and processed by the unit. The number of axle assemblies varies according to the vehicle on which the weighing system is installed. In the vehicle 24 shown in FIG. 1, for example, there are four axle assemblies. Therefore, only four of the signal input ports will be used when installed thereon. Other embodiments of the invention can include any number of signal input ports.

Figure 6:
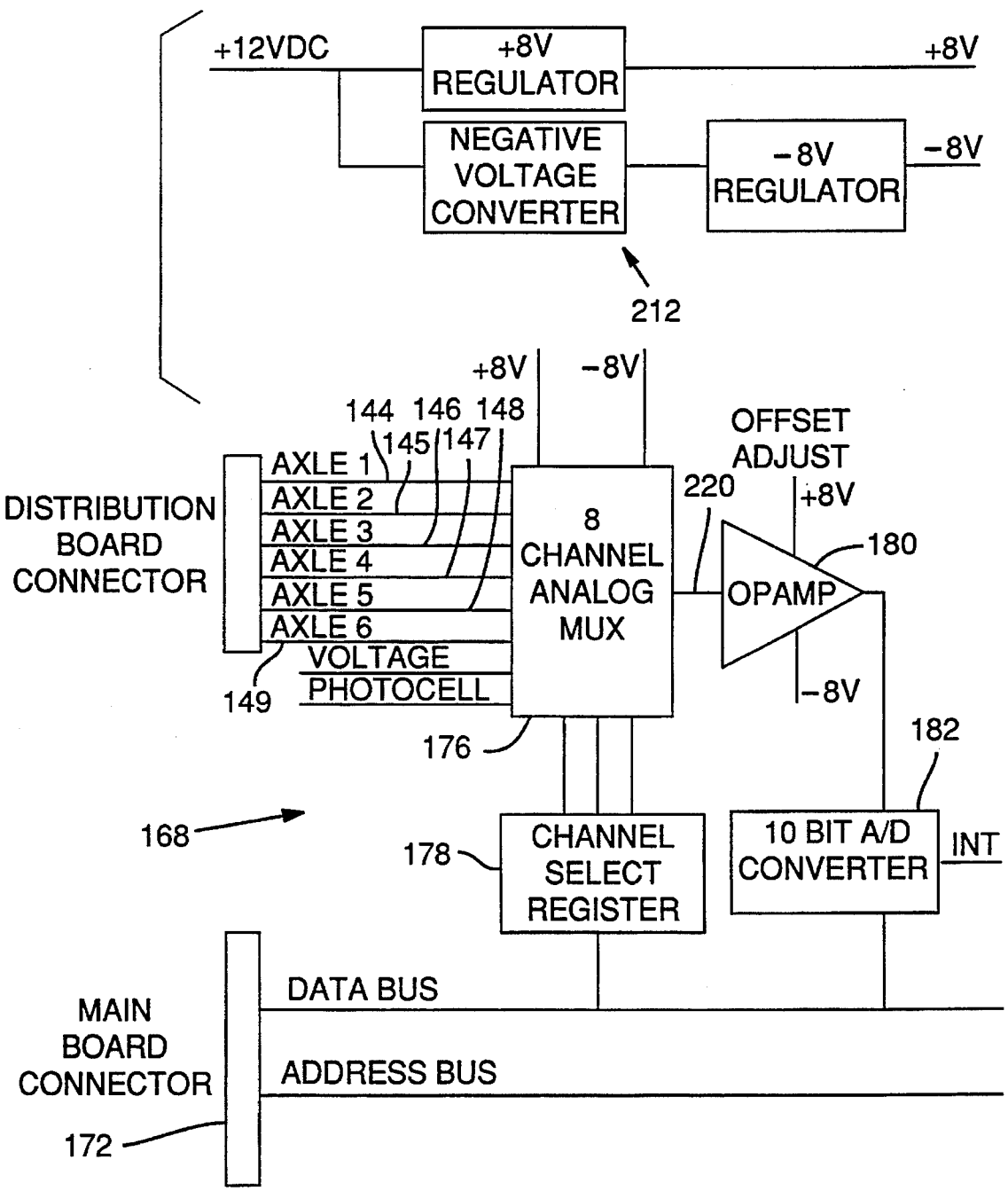
FIG. 6 is a block diagram of a daughter board in the console of FIG. 4.
Figure 7:
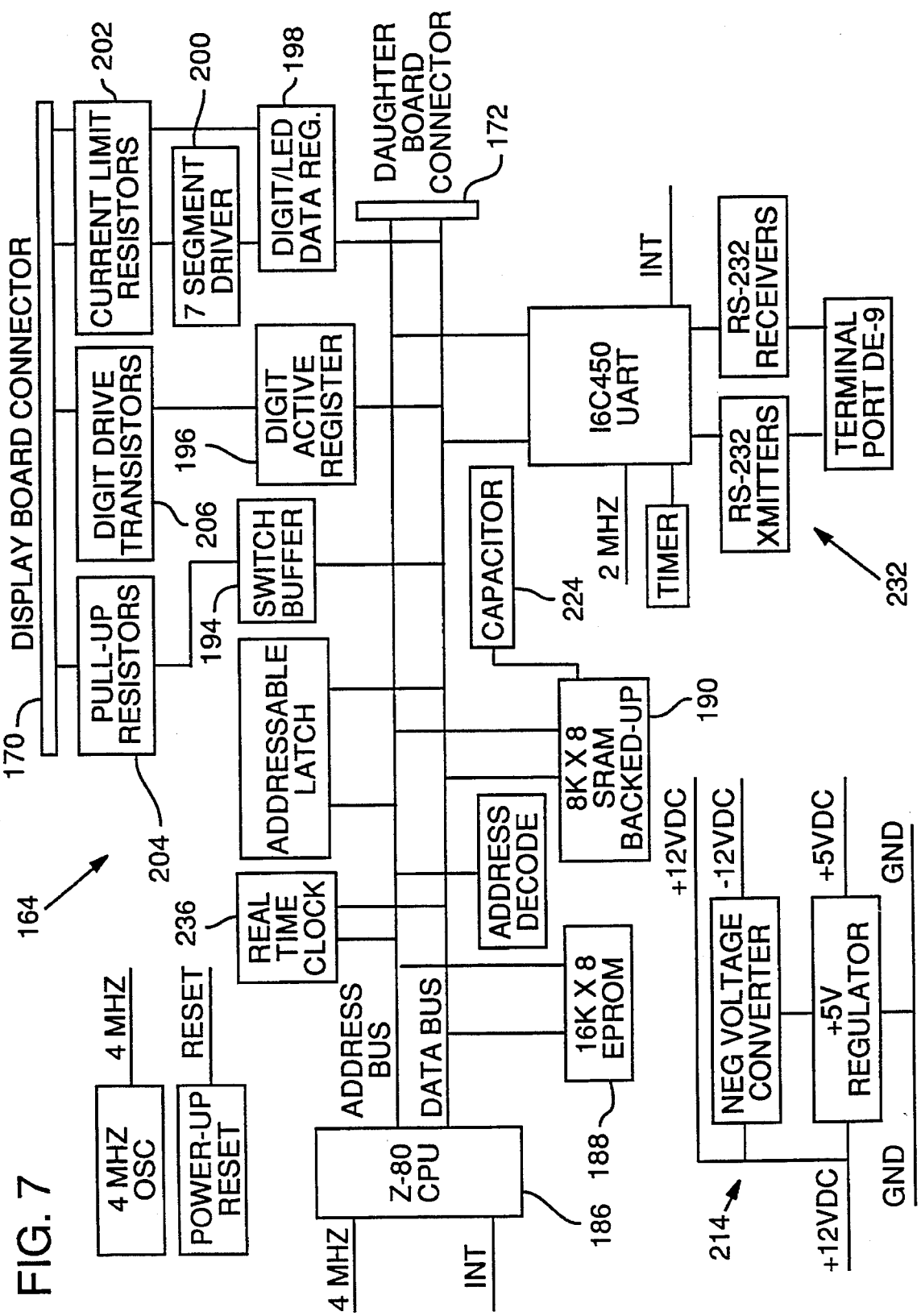
FIG. 7 is a block diagram of a main board in the console of FIG. 4.
Figure 8:
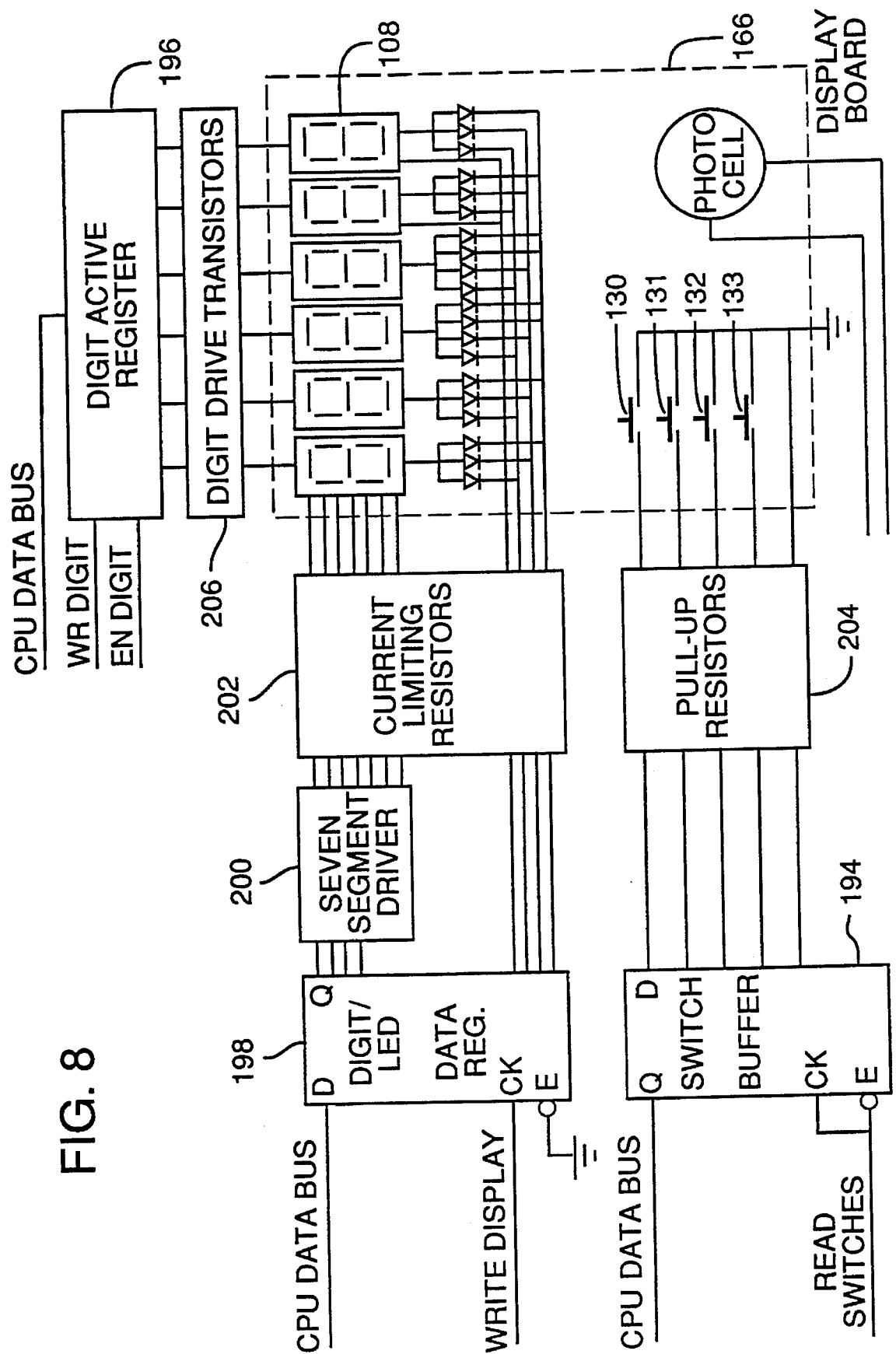
FIG. 8 is a block diagram of a display board in the console of FIG. 4.

With reference to FIGS. 6–8, the console 100 houses electronic circuitry for processing the weight related signals received at the signal ports 144–149. The circuitry is primarily located on three printed circuit boards including a main board 164 (FIG. 7), a display board 166 (FIG. 8), and a daughter board 168 (FIG. 6). The daughter board 168 provides circuitry including an analog multiplexer 176, channel select register 178, offset adjustment amplifier 180, and analog-to-digital converter 182 for selecting and converting one of the weight related signals from the signal input ports 144–149 to a digital value. The main board 164 provides processing circuitry including a microprocessor 186, a read-only memory (EPROM) 188, and a random-access memory (SRAM) 190 for determining vehicle weight measurements from the digitally converted, weight related signals. The main board 164 also provides circuitry including data registers 194–198, seven segment driver 200, current limiting resistors 202, pull-up resistors 204, and drive transistors 206 for indicating the vehicle weight measurements and unit status information on the display 108 and LEDs 110–128 (both on the display board 166). The display and daughter boards 166, 168 are attached to the main board 164 with connectors 170, 172, respectively, which also provide electrical interconnections between the circuitry on the boards.

The unit 20 is preferably supplied with electrical power by an external 12 volt battery, such as a battery in an ignition system of the vehicle 24, which is connected to the unit at the power connector 152 (FIG. 5). From the 12 volt external source, power supply circuits 212, 214 on the daughter and main boards, respectively, provide the various regulated power voltages required by the circuitry on the boards.

Referring again to FIG. 4, by processing the weight related signals, the unit 20 can determine various vehicle weight measurements. In the preferred embodiment, the unit 20 is operative to determine the weights of each axle assembly of the vehicle, gross vehicle weight, and tare vehicle weight. The particular weight measurement determined by the unit is selected by the vehicle operator using the data entry keys 130–133 and the function LEDs 110–122 (the LEDs in a row along the top of the front panel 104 in FIG. 4). Each of the function LEDs 110–122 indicate a function of the unit 20 that can be selected by the operator by activating two of the data entry keys 130, 131 labeled "select" and "enter." When the select key 130 is first activated, the left-most or "KILO" LED 110 of the function LEDs 110–122 begins to flash, indicating that a corresponding function can be selected. Each further activation of the select key 130 causes the next function LED in sequence from left to right to flash. When the LED corresponding to the desired function is flashing, the enter key 131 is activated to select the function. When a function is selected, its corresponding LED remains lit. Several of the functions can be selected in combination, while others are mutually exclusive. The functions that can be selected in the preferred embodiment include the following: "KILO," "SCAN," "GVW," "TARE," "AXLE," "PORT," "TIME," "DATE," "CAL," "EMPTY," "FULL," "RATIO," and "UNSPRUNG WEIGHT."

In its normal mode, the unit 20 processes the weight related signal associated with a selected one of the axle assemblies 32–35 of the vehicle 24 to determine a selected axle assembly weight. (The selected axle assembly weight is the weight applied by the selected axle assembly against a road or other surface supporting the selected axle assembly and includes the weight of the axles, wheels, tires, suspension, and other components which form the selected axle assembly as well as the weight of a portion of the vehicle and load supported by the selected axle assembly.) The axle assembly whose weight is determined is operator selectable. First, the "AXLE" function is selected as described above using the function LEDs 110–122 and the select and enter keys 130, 131. When the AXLE function has been selected, the AXLE function LED 114 remains lit and the left-most LED 123 of the axle LEDs 123–128 (those in a row at the bottom of the front panel 104) flashes. Each subsequent activation of the select key 130 causes the next axle LED in sequence from left to right to flash. Activation of the enter key selects the axle assembly whose corresponding axle LED is flashing. Only one axle assembly at a time can be selected. After the axle assembly is selected, the AXLE function LED 114 is no longer lit.

Referring to FIGS. 6 and 7, the processing of the selected axle assembly's weight related signal to determine the selected axle assembly's weight is carried out by the microprocessor (processor) 186 in accordance with the instructions of a program stored in the EPROM 188. In the preferred embodiment, the processor is a Z-80 type microprocessor. The weight related signal for the selected axle assembly is first converted to a digital value. The processor writes a channel select value corresponding to the selected axle assembly to the channel select register 178. This causes the multiplexer 176 to connect one of the signal input ports 144–149 where the selected axle assembly's weight related signal is received to a multiplexer output 220. The selected axle assembly's weight related signal is then offset adjusted by the amplifier 180 and converted to a digital value by the analog-to-digital converter 182. The digital value is then read by the processor into an internal register.

After acquiring the digital value, the processor processes the digital value using two constants associated with the selected axle assembly. In the preferred embodiment, the constants are a ratio value and an unsprung weight value. The ratio and unsprung weight values characterize a relationship between the weight related signal of the selected axle assembly and its weight. Generally, the unsprung weight of an axle assembly is the portion of the axle assembly weight that is not supported on the axle assembly by the vehicle's suspension. The ratio value is a conversion or scaling factor for converting units of the weight related signal to units of weight, such as pounds. In embodiments of the invention employing sensor assemblies of the type shown in FIG. 2, the ratio value is generally related to the active inner surface area of the air bags in the air suspension supporting the vehicle frame on the axle assembly. Separate ratio and unsprung weight values for each of the axle assemblies 32–35 are stored in the SRAM 190. A capacitor 224 provides backup power to the SRAM 190 in the event of a temporary interruption in power from the external battery to avoid loss of the constants.

The processor comprises circuitry and software routines for adding, subtracting, multiplying and dividing which are used to process the digital value. (The Z-80 microprocessor which is used in the preferred embodiment includes an arithmetic logic unit with adder and subtractor circuitry and software routines for performing multiplication and division with the logic unit's adder and subtractor circuitry.) The processor determines the selected axle assembly's weight by multiplying the selected axle assembly's digital and ratio values to form a product value and adding the axle assembly's unsprung weight value to the product value. The sum of the unsprung weight and product values is, in the preferred embodiment, the selected axle assembly's weight in pounds. Expressed mathematically, the selected axle assembly's weight is determined according to the following equation:

$$W_A = R \cdot S + W_U \qquad (1)$$

where $W_A$ is the selected axle assembly weight, R is the ratio value, s is the digital value of the weight related signal, and $W_U$ is the unsprung weight value.

The processor displays the selected axle assembly weight in pounds on the display 108 using the display circuitry 194–206. However, if the "KILO" function is also selected, the processor further multiplies the weight of the selected axle assembly in pounds by a pounds-to-kilos conversion factor to determine the weight in kilos and displays the weight in kilos on the display 108.

The unit 20 can instead be used to determine and display the gross vehicle weight by selecting the "GVW" function using the function LEDs 110–122 and the select and enter keys 130,131 as described above. When the GVW function is selected, the GVW LED 112 remains lit. The axle LEDs 123–128 corresponding to the "active" axle assemblies will also be lit. When installed on the vehicle 24 (FIG. 1) with four axle assemblies 32–35, for example, only the first through fourth axle LEDs 123–126 will be lit. The unit then determines the weight of each of the active axle assemblies as described above with the ratio and unsprung weight values of the respective axle assembly. The weights of the active axle assemblies are summed by the processor 186 to determine the gross vehicle weight. The gross vehicle weight is displayed on the numeric display 108 in pounds or, if the KILO function has been selected, in kilos.

The "SCAN" function can also be selected as described above using the SCAN LED 111 and the keys 130, 131 to cause the unit 20 to determine the weights of all active axle assemblies 32–35 and the gross vehicle weight as described above and to display those weights in succession for intervals of approximately two seconds. The corresponding axle LED 123–128 is lit as its weight is displayed on the numeric display 108 to identify the displayed weight. The GVW LED 112 and the active axle LEDs are lit to identify when the gross vehicle weight is displayed.

The unit 20 in the preferred embodiment also determines the tare weight of the vehicle 24 when the "TARE" function is selected. The tare weight of a vehicle is defined as the weight of the load alone, or the gross vehicle weight minus the unloaded weight of the vehicle itself. When the TARE function is selected, the unit 20 continuously determines and displays the difference between the current gross vehicle weight and the gross vehicle weight at the time the TARE function is selected. Thus, if the TARE function is selected when the vehicle is empty, the weight determined and displayed by the unit 20 is the true tare weight as defined above. The TARE function can also be used to simply measure a change in the gross vehicle weight. For example, by selecting the TARE function prior to adding an additional load to an already loaded vehicle, the weight of the additional load will be determined and displayed after loading. A negative change in the tare weight, such as when the TARE function is selected prior to removing a portion of the load, can also be determined and displayed. A "NEG" LED 228 on the numeric display 108 will light to indicate a negative tare weight.

Accurate axle weight measurements of an axle assembly through a range of loaded axle weights requires calibration of the ratio and unsprung weight values of the axle assembly at two different axle assembly weights in the preferred embodiment of the invention. To calibrate the ratio and unsprung weight values for a selected axle assembly, the weight of the axle assembly is measured at a first weight, preferably at empty or no load on the axle assembly, using a stationary scale. While the selected axle assembly is at the first weight, the operator selects the "CAL" function as described above using the function LEDs 110–122 and select and enter keys 130, 131. The axle assembly calibrated by the CAL function is selected using the AXLE function as described above. When the CAL function is selected, the CAL LED 118 and the axle LED 123–128 of the selected axle assembly remain lit. The operator further selects the "EMPTY" function. When the EMPTY function is also selected, a weight is displayed on the numeric display 108. Using the left and right arrow keys 132, 133, the operator increases (by activating the right arrow key) or decreases (by activating the left arrow key) the displayed weight until the numeric display 108 displays the first weight as measured by the stationary scale. The first weight is then entered into the unit 20 by activating the enter key 131. When the first weight is entered, the processor 186 (FIG. 7) stores the first weight in the SRAM 190. At this time, the processor 186 also converts the weight related signal for the selected axle assembly at the first weight to a digital value and stores the digital value in the SRAM 190.

When entry of the first weight is complete, the weight of the axle assembly is changed to a second weight by loading the vehicle, preferably to a fully loaded weight. The second weight of the selected axle assembly is then measured on a stationary scale. To enter the second weight, the operator selects the "CAL" and "FULL" functions, adjusts the displayed weight with the arrow keys 132–133, and activates the enter key 131. The processor 186 will then store the entered second weight and the digital value of the selected axle assembly's weight related signal at the second weight to the SRAM 190.

When both the first and second weights have been entered, the processor 186 determines the ratio and unsprung weight values of the selected axle assembly. The processor subtracts the first weight from the second weight to find the difference between the two weights and subtracts the digital value at the first weight from the digital value at the second weight to find a difference between the digital values. Then, the difference between the first and second weights is divided by the difference in the digital values to find the ratio value. Expressed mathematically, the ratio value is determined according to the following equation:

$$R = \frac{W_2 - W_1}{S_2 - S_1} \quad (2)$$

where R is the ratio value, $W_2$ is the second or fully loaded weight, $W_1$ is the first or empty weight, $s_1$ is the digital value of the weight related signal at the second weight, and $s_2$ is the digital value at the first weight.

To determine the unsprung weight value for the selected axle assembly, the processor subtracts the product of the ratio value and the digital value at the first weight from the first weight. Expressed mathematically, the unsprung weight value is then determined according to the following equation:

$$W_U = W_1 - R \cdot s_1 \quad (3)$$

where $W_U$ is the unsprung weight value.

Once the ratio and unsprung weight values for an axle assembly have been determined, it is not necessary to repeat the calibration procedure at any subsequent time that the unit 20 is used to measure the axle assembly's weight. Thus, the trailer or trailers 28, 29 hauled by the tractor 26 can be switched for another trailer whose axle assembly's ratio and unsprung weight values have already been calibrated without having to repeat the calibration procedure for the new trailers.

When the ratio and unsprung weight values for the axle assemblies of a newly attached trailer are already known, the values can be entered directly into the unit 20. To enter the ratio value for a new axle, the operator first selects the axle assembly using the AXLE function. Second, the operator selects the CAL function, then the "RATIO" function. When the CAL and RATIO functions are selected, the CAL and RATIO LEDs 118, 121 are lit and the ratio value for the old axle assembly is displayed on the numeric display 108. The operator adjusts the displayed ratio value on the display 108 with the left and right arrow keys 132, 133 until the known ratio value of the new axle assembly is displayed, then enters the ratio value by activating the enter key 131. The unsprung weight value of the new axle assembly is similarly entered with the arrow and enter keys 131–133 after selecting the CAL and "UNSPRUNG WEIGHT" functions.

To facilitate a regular practice of trailer switching, a record of the ratio and unsprung weights of trailers used with the tractor 26 can be kept so that the ratio and unsprung weight values are available to enter into the unit 20 when switching trailers. For example, the ratio and unsprung weight values of a trailer's axle assemblies can be marked in a convenient location on the trailer so that the values are readily available when switching trailers.

The unit 20 provides further weight reporting capabilities in addition to providing a visual display of the weights on the numeric display 108. When the "PORT" function is selected, the unit 20 determines the weights of the active axle assemblies and the gross vehicle weight as described above. The unit then transmits a "report" including the weight information using transmitting/receiving circuitry 232 on the main board 164 (FIG. 7) to a device connected to the data input/output port 154 on the back panel 106 (FIG. 5). The data input/output port 154 is connectable to a printer, a computing device, a data transmitting device, or like devices. When the part 154 is connected to a printer, a printed record of the vehicle's weights can be provided. Remote reporting of the vehicle's weights can also be provided when the data port 154 is connected to a computing or data transmitting device.

To provide "time and date stamping" of the transmitted report, the unit 20 includes a real time clock circuit 236 on the main board 164 (FIG. 7). The correct time is set in the unit by selecting the "TIME" function with the function LEDs and select and enter keys 130–131, then entering the time using the left and right arrow keys 132, 133, numeric display 108, and the enter key 131. The correct time is set in a like manner using the "DATE" function. After the correct time and date are set in the unit 20, the real time clock circuit 236 tracks the current time. Later, when the PORT function is selected, the current time and date are included in the transmitted report.

The data input/output port 154 and transmitting/receiving circuitry 232 can also be used to receive commands from an external source such as a computing device, to allow remote control of the unit 20. The commands recognized by the unit 20 are generally equivalent to the functions selectable with the function LEDs 110–122 and select and enter keys 130, 131. For example, the commands allow a remote computing device to enter time, date, and ratio and unsprung weight values for a vehicle's axle assemblies. A remote computing device can also command the unit 20 to transmit report information.

The preferred embodiment of the invention in which the unit 20 processes the weight related signal generated by a sensor assembly using two values is applicable to sensor assemblies which generate a signal that is linearly related to the axle assembly weight (or other vehicle weight parameter). In general, a sensor assembly 22 of the type shown in FIG. 2 generates a signal that is linearly related to the axle assembly weight when the pressure transducer 64 operates linearly and the height leveling valve 52 maintains the vehicle frame 48 at a constant height above the axle 46. The linearity of a signal generated by a sensor assembly of the type shown in FIG. 3 depends on the springs 80 compressing such that the displacement between the vehicle underside 84 and the axle 78 decreases linearly in relation to the weight of the vehicle 24 and on the displacement transducer 86 operating linearly.

Having described and illustrated the principles of our invention with reference to a preferred embodiment, it will be recognized that the invention can be modified in arrangement and detail without departing from such principles. In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A vehicle weighing method for measuring the loaded weight of a vehicle axle assembly, comprising:

associating two values with an axle assembly of a vehicle;

producing an analog electrical signal related to the weight on the vehicle axle assembly;

converting the weight related signal to digital form;

processing the weight related signal to form an axle weight measurement related to a function of the weight related signal and the values; and visually indicating the axle weight measurement.

2. The vehicle weighing method of claim 1 comprising:

associating two values with each of one or more additional axle assemblies of a vehicle;

producing analog electrical signals related to the weight on the additional vehicle axle assemblies;

converting the weight related signals to digital form;

processing the weight related signals to form axle weight measurements related to a function of the respective weight related signals and values; and visually indicating the axle weight measurements.

3. The vehicle weighing method of claim 2 for also measuring the gross vehicle weight, comprising:

summing the axle weight measurements to form a gross vehicle weight measurement; and visually indicating the gross vehicle weight measurement.

4. The vehicle weighing method of claim 3 comprising:

visually indicating in sequence the axle weight measurements and the gross vehicle weight measurement.

5. The vehicle weighing method of claim 3 for also measuring the tare vehicle weight, comprising:

determining a difference between the gross vehicle weight and a selected weight, the difference being the tare vehicle weight; and visually indicating the tare vehicle weight.

6. The vehicle weighing method of claim 1 wherein the values are a ratio value and an unsprung weight value.

7. The vehicle weighing method of claim 6 wherein the step of processing the weight related signal comprises:

multiplying the weight related signal by the ratio value; and adding the unsprung weight value to the product of the weight related signal and the ratio value.

8. The vehicle weighing method of claim 6 wherein the step of associating two values with the vehicle axle assembly comprises:

weighing the vehicle axle assembly while the vehicle is at a first vehicle weight;

determining the value of the weight related signal when the vehicle is weighed while at the first vehicle weight;

weighing the vehicle axle while the vehicle is at a second vehicle weight, the second vehicle weight being greater than the first vehicle weight;

determining the value of the weight related signal when the vehicle is weighed while at the second vehicle weight; and determining a ratio value equal to the ratio of the difference between the axle assembly weight at the first vehicle weight and the axle assembly weight at the second vehicle weight to the difference between the value of the weight related signal at the first vehicle weight and the value of the weight related signal at the second vehicle weight.

9. The vehicle weighing method of claim 8 wherein the step of associating two values with the vehicle axle assembly further comprises:

determining an unsprung weight value equal to the difference between the axle assembly weight at the first vehicle weight and the product of the ratio value and the value of the weight related signal at the first vehicle weight.

10. The vehicle weighing method of claim 9 further comprising:

entering the axle assembly weights at the first and second vehicle weights into a processing unit; and determining the ratio and unsprung weight values with the processing unit.

11. In the vehicle weighing method of claim 1, a method of permitting switching of a trailer of a tractor/trailer combination truck, the method comprising:

associating two values with each axle assembly of a first trailer;

associating two values with each axle assembly of a second trailer;

recording the values associated with the axle assemblies of the trailers;

when switching to a trailer, entering the values associated with the trailer's axle assemblies into a processing unit; and processing a digitized signal related to the weight on an axle assembly of the trailer with the processing unit to form an axle weight measurement as a function of the weight related signal and the two values associated with the trailer axle assembly.

12. The method of claim 11 wherein the step of recording comprises:

marking the values associated with the axle assemblies of a trailer on the trailer.

13. A weight measuring apparatus for a vehicle having a frame and a frame supporting axle assembly, comprising:

a sensor assembly mounted between the frame and the axle assembly for producing an analog electrical signal related to the weight carried on the axle assembly, the axle assembly having associated therewith a ratio value and an unsprung weight value;

an analog to digital converter electrically coupled to the sensor assembly for producing a digital signal corresponding to the analog electrical signal;

a processor for processing the digital signal by adding the unsprung weight value to the product of the ratio value and the digital signal to produce axle weight data; and a display for visually indicating weight measurements of the vehicle responsive to the axle weight data.

14. The apparatus of claim 13 for a vehicle having plural axle assemblies supporting the frame, comprising:

a plurality of sensor assemblies mounted between the frame and the axle assemblies, each sensor assembly producing an analog electrical signal related to the weight carried on a respective axle assembly, each axle assembly having associated therewith a ratio value and an unsprung weight value; and the processor being operative to produce axle weight data for each axle assembly by adding the respective axle assembly's associated unsprung weight value to a product of the respective axle assembly's associated ratio value and the corresponding signal related to the weight carried on the respective axle assembly.

15. The apparatus of claim 14 wherein the plurality of sensor assemblies correspond one to one with the plural axle assemblies.

16. The apparatus of claim 14 wherein the processor is further operative to produce gross vehicle weight data by summing the axle weight data for the axle assemblies, and the display is operative to visually indicate the gross vehicle weight responsive to the gross vehicle weight data.

17. The apparatus of claim 16 wherein the display is operative to visually indicate each axle assembly weight and the gross vehicle weight in sequence.

18. The apparatus of claim 16 wherein the processor is further operative to produce tare vehicle weight data by subtracting a selected weight value from the gross vehicle weight data, and the display is operative to visually indicate the tare vehicle weight responsive to the tare vehicle weight data.

19. The apparatus of claim 13 for a vehicle wherein the axle assembly comprises plural axles grouped to support a portion of the frame.

20. The apparatus of claim 13 for a vehicle wherein the axle assembly comprises a single axle supporting a portion of the frame.

21. The apparatus of claim 13 for a vehicle wherein the frame is supported on the axle assembly by an air spring of an air suspension system, and wherein the sensor assembly comprises:

a pressure transducer coupled to the air spring for producing an analog electrical signal related to the interior air pressure of the air spring, whereby the analog electrical signal is related to the weight carried on the axle assembly.

22. The apparatus of claim 21 wherein the ratio value is related to the active inner surface area of the air spring and the unsprung weight value is related to the unsprung weight of the axle assembly.

23. The apparatus of claim 13 for a vehicle wherein the frame is suspended from the axle assembly on a spring suspension system, and wherein the sensor assembly comprises:

a displacement transducer for producing an analog electrical signal related to the displacement of the frame from the axle assembly, whereby the analog electrical signal is related to the weight carried on the axle assembly.

24. The apparatus of claim 13 comprising:

input means for user entry of the unsprung weight and ratio values.

25. The apparatus of claim 13 comprising:

input means for user entry of a first weight value and a second weight value while the vehicle is at first and second weights, respectively;

the processor determining the ratio value as equal to the ratio of the difference between the first and second weight values to the difference in the digital signal at the first and second vehicle weights, and the unsprung weight value as equal to the difference between the first weight value and the product of the ratio value and the digital signal at the first vehicle weight.

26. The apparatus of claim 13 wherein the sensor assembly produces an analog electrical signal which is linearly related to the weight carried on the axle assembly.

* * * * *